United States Patent [19]
Watanabe et al.

[11] Patent Number: 5,299,648
[45] Date of Patent: Apr. 5, 1994

[54] DRIVER CURRENT LIMITING METHOD IN ELECTRIC POWER STEERING APPARATUS

[75] Inventors: Masaki Watanabe; Shinobu Kamono, both of Saitama; Ryuji Lizawa, Kanagawa, all of Japan

[73] Assignees: Jidosha Kiki Co., Ltd.; Fujitsu Limited, Japan

[21] Appl. No.: 916,892

[22] Filed: Jul. 20, 1992

[30] Foreign Application Priority Data

Jul. 22, 1991 [JP] Japan .................. 3-204606

[51] Int. Cl.5 .......................... B62D 5/04
[52] U.S. Cl. .................. 180/79.1; 180/142; 318/489
[58] Field of Search ......... 180/79.1, 32, 141, 142; 364/925, 925.1–925.3, 424.01, 424.05; 318/2, 489, 675, 434

[56] References Cited

U.S. PATENT DOCUMENTS

| 4,753,310 | 6/1988 | Hashimoto | 180/79.1 |
| 5,040,630 | 8/1991 | Murishita | 180/79.1 |
| 5,150,021 | 9/1992 | Kamano | 180/79.1 |
| 5,156,227 | 10/1992 | Taniguchi | 180/79.1 |
| 5,182,711 | 1/1993 | Takahashi | 180/79.1 |
| 5,202,830 | 4/1993 | Tsurumiya | 180/79.1 |

FOREIGN PATENT DOCUMENTS 1-197169  8/1989  Japan .

Primary Examiner—Robert J. Oberleitner
Assistant Examiner—Clifford T. Bartz
Attorney, Agent, or Firm—Blakely, Sokoloff, Taylor & Zafman

[57] ABSTRACT

According to a current limiting method in an electric power steering apparatus, a steering angular speed and the direction of a drive current are monitored. A condition in which a steering wheel is locked is discriminated from a condition in which the steering wheel is turned on the basis of combinations of the steering angular speed and the drive current direction. Processing of limiting a current value of an excessive drive current is executed only when the condition in which the steering wheel is locked is determined.

2 Claims, 4 Drawing Sheets

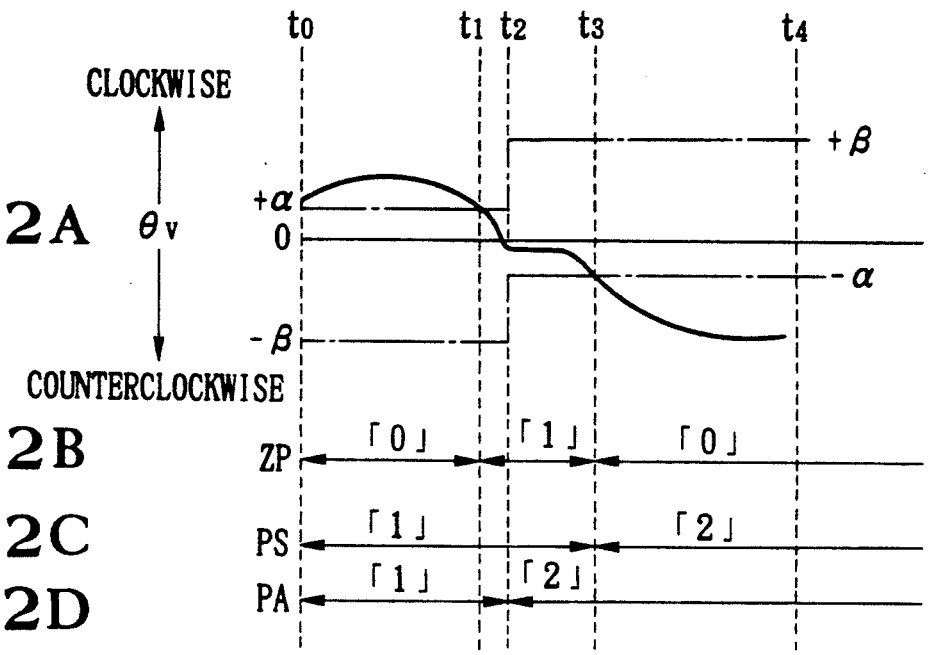
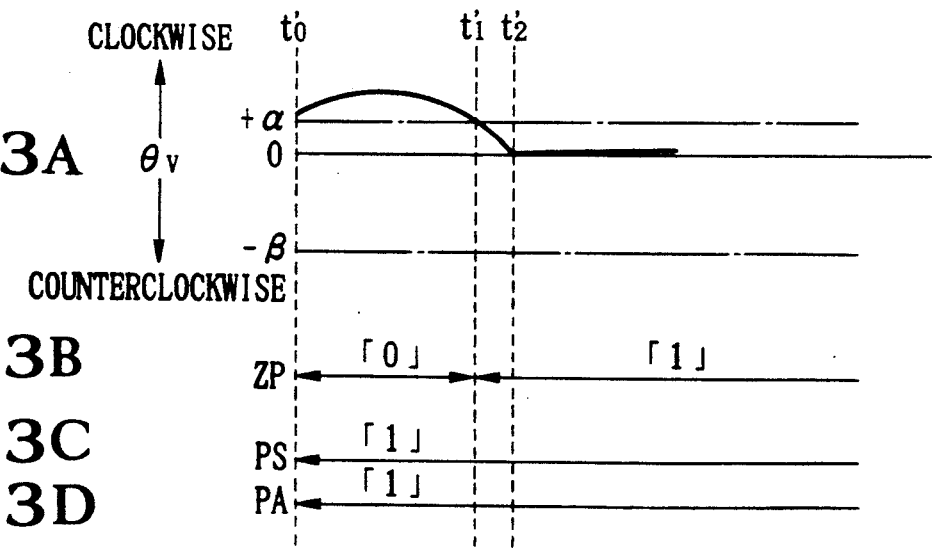

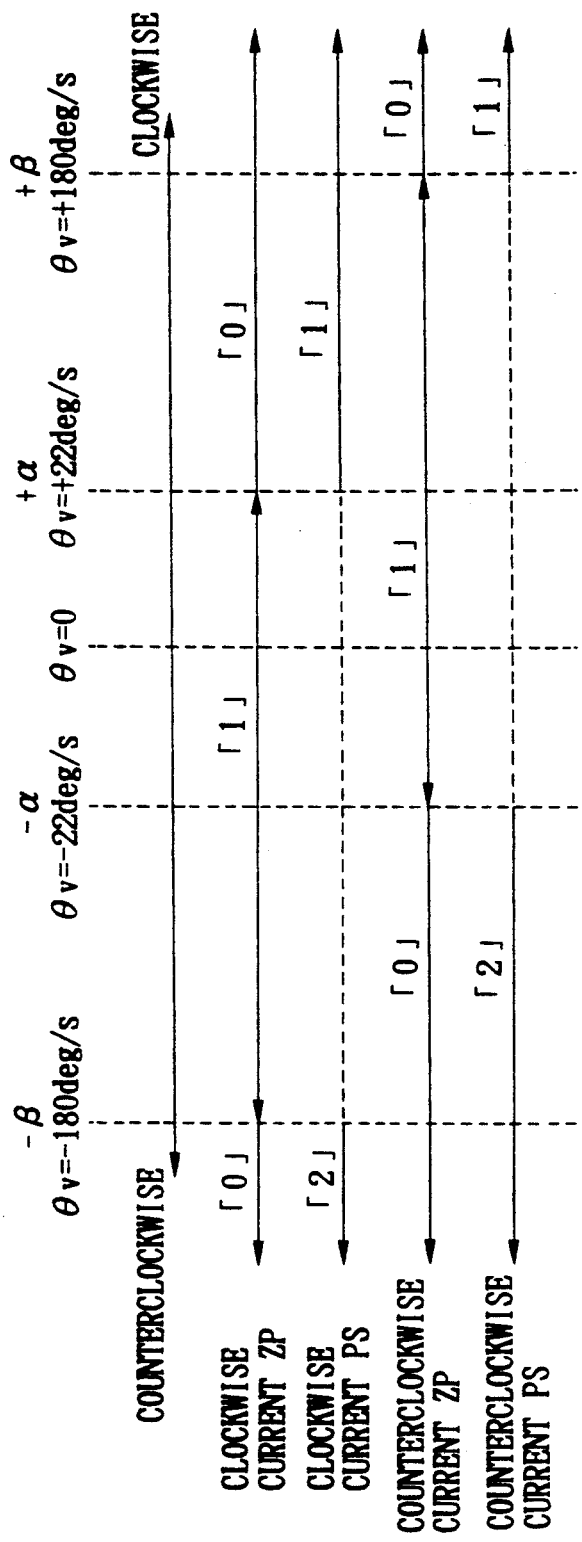

DRIVER CURRENT LIMITING METHOD IN ELECTRIC POWER STEERING APPARATUS

BACKGROUND OF THE INVENTION

The present invention relates to a drive current limiting method in an electric power steering apparatus.

In a conventional electric power steering apparatus, a drive current to a motor for generating an auxiliary steering torque (to be simply referred to as a motor hereinafter) is monitored. If a drive current exceeding a predetermined value flows over a predetermined time period, an overcurrent countermeasure limits the current value (see Japanese Patent Laid-Open No. 1-197169).

When a steering wheel is locked, for example, this countermeasure limits an excessive drive current to a motor and in this manner prevents damage from a fire caused by a temperature rise in the motor or protects a battery.

Such a conventional current limiting method, however, limits the current value of an excessive drive current flowing when a steering wheel is abruptly turned. As a result, a force required to turn the steering wheel is suddenly increased to cause unsmoothness in a steering operation.

SUMMARY OF THE INVENTION

It is, therefore, a principal object of the present invention to provide a drive current limiting method in an electric power steering apparatus, which can eliminate unsmoothness in a steering operation caused when a steering wheel is quickly turned.

In order to achieve the above object, according to one aspect of the present invention, there is provided a current limiting method in an electric power steering apparatus, which monitors a magnitude of a drive current supplied to a motor for generating an auxiliary steering torque and limits a current value of an excessively flowing drive current, comprising the steps of monitoring a steering angular speed and a direction of the drive current, discriminating a condition in which a steering wheel is locked from a condition in which the steering wheel is turned on the basis of combinations of the steering angular speed and the drive current direction, and executing processing of limiting a current value of an excessive drive current only when the condition in which the steering wheel is locked is determined.

BRIEF DESCRIPTION OF THE DRAWINGS

FIGS. 2(a) to 2(d) are timing charts showing an embodiment of the drive current limiting method in an electric power steering apparatus according to the present invention, which explains a condition in which a steering wheel is abruptly turned counterclockwise;

FIGS. 3(a) to 3(d) are timing charts for explaining that a current is limited without any delay when a steering wheel is locked;

FIGS. 4(a) to 4(d) are charts showing the relationship between the values of a steering speed change monitor flag ZP and a steering change monitor flag PS and a steering angular speed $\theta v$.

DETAILED DESCRIPTION OF THE PREFERRED EMBODIMENT

A preferred embodiment of the present invention will be described in detail below.

Figure 1:
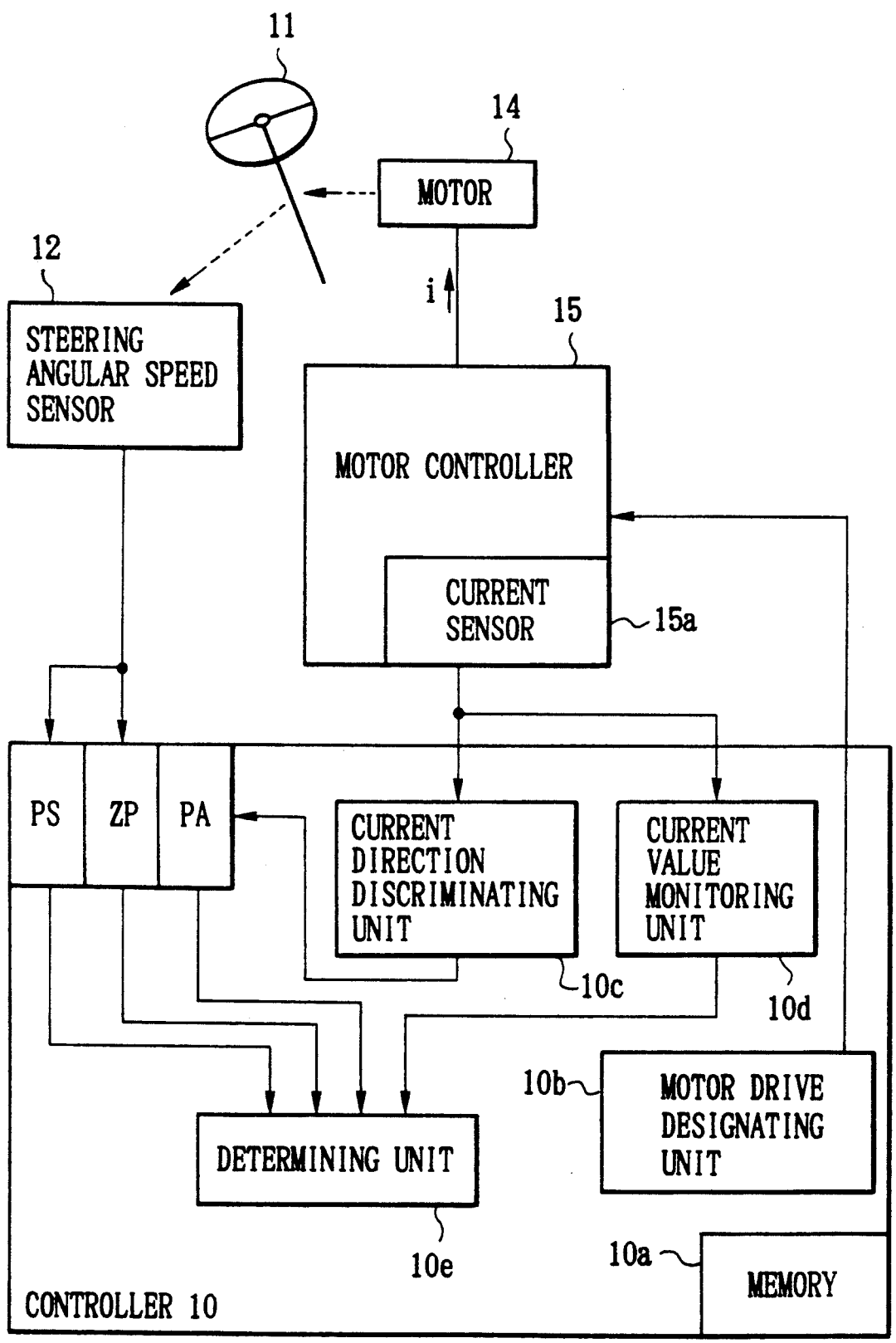
FIG. 1 is a block diagram for explaining a drive current limiting method in an electric power steering apparatus according to the present invention.

FIG. 1 shows an embodiment of a power steering apparatus for explaining a drive current limiting method of the present invention. Referring to FIG. 1, reference numeral 10 denotes a controller incorporating a CPU (Central Processing Unit); 11, a steering wheel; 12, a sensor for detecting the steering angular speed of the steering wheel 11; and 14, a motor for supplying an auxiliary steering torque to the steering wheel 11. Reference numeral 15 denotes a motor controller for controlling a drive current i to be supplied to the motor 14 in order to cause the motor 14 to generate the auxiliary steering torque, under the control of the controller 10. The motor controller 15 incorporates a sensor 15a for detecting the motor drive current. The controller 10 includes, in addition to the CPU described above, a memory 10a for storing programs for controlling the motor 14, a motor drive designating unit 10b, a current direction discriminating unit 10c for discriminating a current direction on the basis of a signal from the current sensor 15a, a current value monitoring unit 10d for monitoring a drive current value on the basis of the signal from the current sensor 15a, and a determining unit 10e. The determining unit 10e determines present environments of an operation on the basis of a content PA of a current direction monitor flag register provided in the controller 10, a content ZP of a steering speed change monitor flag register in the controller 10, a content PS of a steering change monitor flag register in the controller 10, and the content of the current value monitoring unit 10d. The determining unit 10e then issues designation based on the determination result to the motor drive designating unit 10b.

The current limiting method in the electric power steering apparatus according to the present invention will be described in detail below with reference to FIG. 1 described above and FIGS. 2(a) to 4(d).

The current limiting method according to this embodiment uses the steering speed change monitor flag ZP, the steering change monitor flag PS, and the current direction monitor flag PA. The drive current i to the motor 14 is limited when the steering speed change monitor flag ZP is "1" (ZP="1"), the steering change monitor flag PS is equal to the current direction monitor flag PA (PS=PA), and the drive current i to the motor is larger than a current limiting threshold value I ($I_R$ for a clockwise current (a current for a clockwise rotation) and $I_L$ for a counterclockwise current (a current for a counterclockwise rotation)).

That is, in a case wherein the steering speed change monitor flag ZP is "1" but the steering change monitor flag PS is not equal to the current direction monitor flag PA, the determining unit 10e does not send a signal for limiting the drive current i to the motor 14 to the motor drive designating unit 10b (i.e., does not limit the drive current i) even if the drive current i exceeds the current limiting threshold value I.

The steering speed change monitor flag ZP is used to set the window of a steering angular speed $\theta v$. As shown in FIG. 4(a), when the drive current i to the motor 14 is the clockwise current, the flag ZP is set at "1" in the range from angular speed $\theta v = +\alpha = +22$ deg/s in a direction of clockwise steering (+direction) to angular speed $\theta v = -\beta = -180$ deg/s in a direction of counterclockwise steering (−direction). As shown in FIG. 4(c), when the drive current i to the motor is the counterclockwise current, the flag ZP is set at "1" in the range from angular speed $\theta v = -\alpha = -22$ deg/s in the direction of counterclockwise steering to angular speed $\theta v = +\beta = +180$ deg/s in the direction of clockwise steering. That is, a window which is large in a steering direction opposite to the direction of the drive current i and small in that steering direction is set as "0" of the steering angular speed $\theta v$.

As shown in FIG. 4(b), when the drive current i to the motor 14 is the clockwise current, the steering change monitor flag PS is set at "1" in the range of $\theta v > +\alpha$ and "2" in the range of $\theta v < -\beta$. As shown in FIG. 4(d), when the drive current i to the motor 14 is the counterclockwise current, the flag PS is set at "2" in the range of $\theta v < -\alpha$ and "1" in the range of $\theta v > +\beta$. Broken lines shown in of FIGS. 4(b) and 4(d) indicate regions which represent windows except for "1" and "2" above. These regions are not directly associated with the present invention and a detailed description thereof will be omitted.

Note that in FIG. 4(b), when the state transits from $\theta v > +\alpha$ to $\theta v \leq +\alpha$ or from $\theta v < -\beta$ to $\theta v \geq -\beta$, the steering change monitor flag PS holds its value until the state falls outside the window of the steering angular speed $\theta v$ at that moment. Similarly, when the state transits from $\theta v > +\beta$ to $\theta v \leq +\beta$ or from $\theta v < -\alpha$ to $\theta v \geq -\alpha$ in FIG. 4(d), the steering change monitor flag PS holds its value until the state falls outside the window of the steering angular speed $\theta v$ at that moment.

The current direction monitor flag PA is set at "1" when the drive current i to the motor 14 is the clockwise current and "2" when the current i is the counterclockwise current.

FIGS. 2(a) to 2(d) show a condition in which a steering direction is abruptly changed from clockwise to counterclockwise, i.e., a steering wheel is abruptly turned counterclockwise. FIG. 2(a) shows a change in the steering angular speed $\theta v$; FIG. 2(b), a value of the steering speed change monitor flag ZP; FIG. 2(c), a value of the steering change monitor flag PS; and FIG. 2(d), a value of the current direction monitor flag PA.

In FIGS. 2(a) to 2(d), assume, for example, that a sudden turn of a steering wheel from clockwise to counterclockwise is started at time $t_0$ when $\theta v > +\alpha$. At this time, the steering speed change monitor flag ZP is "0", the steering change monitor flag PS is "1", and the current direction monitor flag PA is "1".

When $\theta v \leq +\alpha$ (at time $t_1$), the steering speed change monitor flag ZP goes to "1" while steering change monitor flag PS="1" and current direction monitor flag PA="1".

At time $t_2$, the drive current i to the motor 14 changes from the clockwise current to the counterclockwise current, and the current direction monitor flag PA changes from "1" to "2". Since the drive current i to the motor 14 changes from the clockwise current to the counterclockwise current, the steering speed change monitor flag ZP follows changes in FIG. 4(c) and the steering change monitor flag PS follows changes in FIG. 4(d).

When $\theta v < -\alpha$ (at time $t_3$), the steering speed change monitor flag ZP goes to "0" and the steering change monitor flag PS goes to "2". At time $t_4$, the turn of the steering wheel from clockwise to counterclockwise is finished.

The values of the flags ZP, PS, and PA from time $t_2$ to time $t_3$ after the drive current i to the motor 14 changed from the clockwise current to the counterclockwise current will be considered. In this case, ZP="1", PS="1", and PA="2", i.e., ZP="1" and PS=PA are not simultaneously established. Therefore, the drive current i to the motor 14 is not limited even if it exceeds the current limiting threshold value $I_L$.

Note that although ZP="1" and PS=PA="1" are momentarily established during a time interval from time $t_1$ to time $t_2$, the drive current has not changed yet from the clockwise current to the counterclockwise current at that time. Therefore, the drive current i to the motor 14 is not limited because it does not exceed the current limiting threshold value $I_R$.

FIGS. 3(a) to 3(d) show a condition in which a steering wheel is locked. FIGS. 3(a) to 3(d) correspond to FIGS. 2(a) to 2(d), respectively.

When $\theta v \leq +\alpha$ (at time $t_1'$), the steering speed change monitor flag ZP goes to "1" while steering change monitor flag PS="1" and current direction monitor flag PA="1". This condition of ZP="1" and PS=PA="1" continues after steering angular speed $\theta v = 0$ is reached (from time $t_2'$) because the direction of the drive current i does not change. When a steering wheel is locked, therefore, the drive current i is limited without any delay from time $t_1'$ by the designation of the motor drive designating unit 10b.

According to the current limiting method of this embodiment as described above, a condition in which a steering wheel is turned is discriminated from a condition in which it is locked, as is apparent from the comparison between the portion from time $t_2$ in FIGS. 2(a) to 2(d) and the portion from time $t_2'$ in FIGS. 3(a) to 3(d). Therefore, in a case wherein a steering wheel is quickly turned, the current value of the drive current i to the motor 14 is not limited even if it excessively flows. When a steering wheel is locked, on the contrary, the current is limited without any delay.

Figure 5:
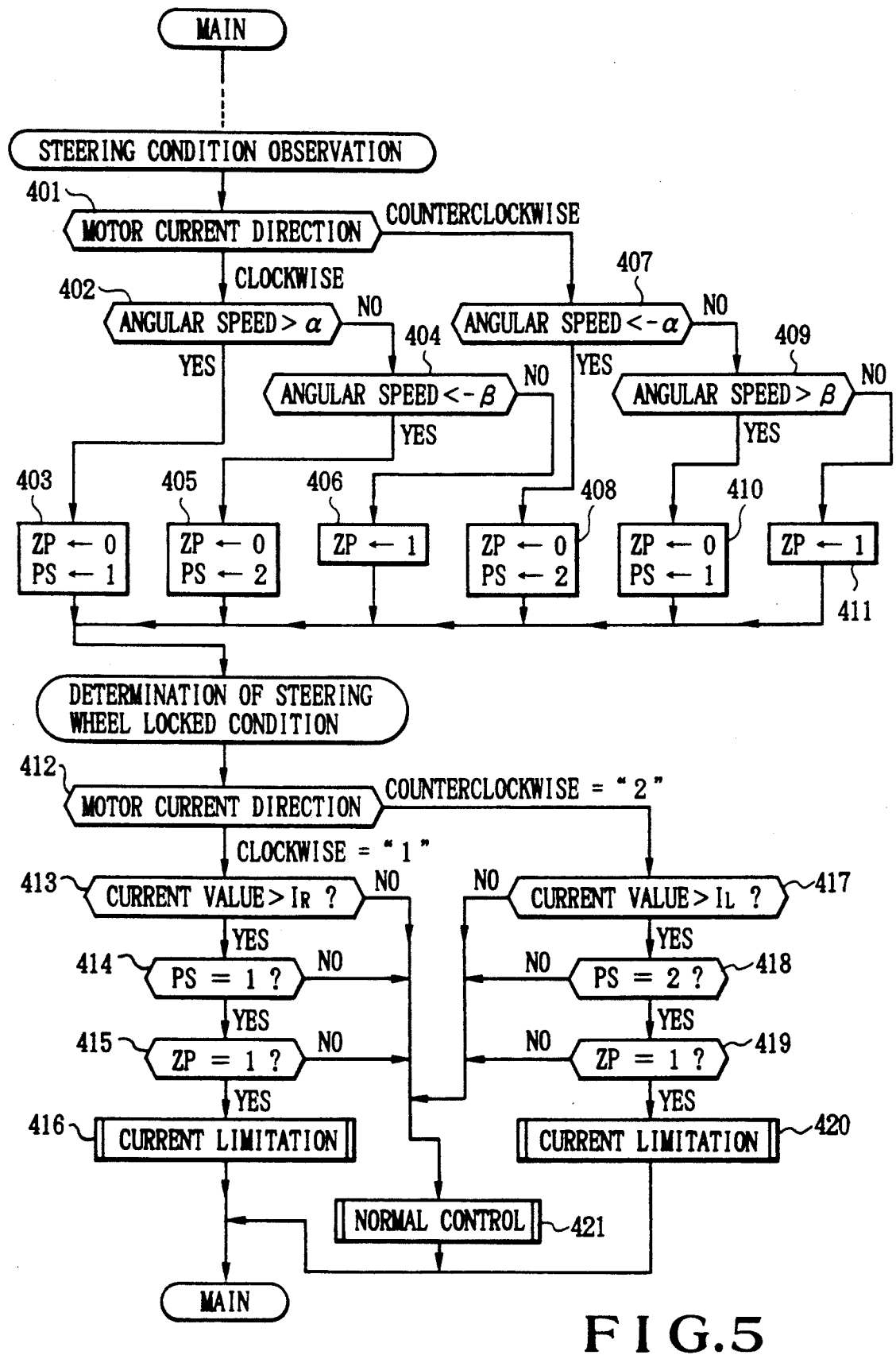
FIG. 5 is a flow chart for explaining an operation of an electric power steering apparatus to which this current limiting method is applied.

FIG. 5 shows a flow chart for explaining an operation of the electric power steering apparatus to which the current limiting method described above is applied. According to this flow chart, present values of the flags ZP and PS are set in steps 401 to 411. In steps 412 to 416, current limiting processing for a case wherein a steering wheel is locked clockwise is executed without any delay under the control of the motor drive designating unit 10b. Similarly, in steps 417 to 420, current limiting processing for a case wherein a steering wheel is locked counterclockwise is executed without any delay.

FIG. 5 will be described in more detail below. In accordance with the programs stored in the memory 10a, the controller 10 which is in operation performs the following observation of a steering condition on the basis of detection signals from the steering angular speed sensor 12, the drive current direction sensor 16, and the like. In step 401, the determining unit 10e checks the drive current direction of the motor 14 on the basis of the signal from the sensor 16. If clockwise steering is determined in step 401, the flow advances to step 402, and the determining unit 10e checks whether the steering angular speed obtained from the sensor 12 is larger than "$\alpha$".

If the steering angular speed is larger than "$\alpha$" in step 402, the flow advances to step 403, and the controller 10 sets the steering speed change monitor flag ZP at "0" and the steering change monitor flag PS at "1".

If the steering angular speed is equal to or smaller than "α" in step 402, the flow advances to step 404, and the determining unit 10e checks whether the steering angular speed is smaller than "−β". If the steering angular speed is smaller than "−β" in step 404, the flow advances to step 405, and the controller 10 sets the steering speed change monitor flag ZP at "0" and the steering change monitor flag PS at "2". If the steering angular speed is equal to or larger than "−β" in step 404, the flow advances to step 406, and the steering speed change monitor flag ZP is set at "1".

In step 401, as described above, the determining unit 10e checks the drive current direction of the motor 14 on the basis of the signal from the sensor 16. If counterclockwise steering is determined in step 401, the flow advances to step 407, and the determining unit 10e checks whether the steering angular speed obtained from the sensor 12 is smaller than "−α".

If the steering angular speed is smaller than "−α" in step 407, the flow advances to step 408, and the controller 10 sets the steering speed change monitor flag ZP at "0" and the steering change monitor flag PS at "2".

If the steering angular speed is equal to or larger than "−α" in step 407, the flow advances to step 409, and the determining unit 10e checks whether the steering angular speed is larger than "β". If the steering angular speed is larger than "β" in step 409, the flow advances to step 410, and the controller 10 sets the steering speed change monitor flag ZP at "0" and the steering change monitor flag PS at "1". If the steering angular speed is equal to or smaller than "β" in step 409, the flow advances to step 411, and the steering change monitor flag ZP is set at "1".

After the flag processing is performed in steps 403, 405, 406, 408, 410, and 411, the following steps of checking whether a steering wheel is locked are executed.

In step 412, the determining unit 10e checks the drive current direction of the motor 14 on the basis of the signal from the sensor 16. If a current for clockwise steering is determined (PA="1") in step 412, the flow advances to step 413, and the determining unit 10e checks whether the value of the drive current i is larger than the current limiting threshold value $I_R$ for clockwise rotation.

If the value of the drive current i is larger than the current limiting threshold value $I_R$ for clockwise rotation in step 413, the flow advances to step 414, and the determining unit 10e checks whether the steering change monitor flag PS is "1". If the steering change monitor flag PS is "1" in step 414, the flow advances to step 415, and the determining unit 10e checks whether the steering speed change monitor flag ZP is "1".

If the steering speed change monitor flag ZP is "1" in step 415, the flow advances to step 416, and predetermined current limiting processing is executed.

If YES is not obtained in any of steps 413, 414, and 415, the flow advances to step 421, and a normal control operation is performed.

If the motor current direction indicates counterclockwise steering (PA="2") in step 412, the flow advances to step 417, and the determining unit 10e checks whether the value of the drive current i is larger than the current limiting threshold value $I_L$ for counterclockwise rotation.

If the value of the drive current i is larger than the current limiting threshold value $I_L$ for counterclockwise rotation in step 417, the flow advances to step 418, and the determining unit 10e checks whether the steering change monitor flag PS is "2". If the steering change monitor flag PS is "2", the flow advances to step 419, and the determining unit 10e checks whether the steering speed change monitor flag ZP is "1".

If the steering speed change monitor flag ZP is "1" in step 419, the flow advances to step 420, and predetermined current limiting processing is executed.

As has been described above, according to the present invention, the steering angular speed and the direction of the drive current are monitored to identify a condition in which a steering wheel is turned. Therefore, even when an excessive drive current flows in response to a rapid turn of a steering wheel, its current value is not limited. As a result, it is possible to eliminate unsmoothness in a steering operation caused when a steering wheel is suddenly turned, while current limiting processing is executed without any delay when a steering wheel is locked.

What is claimed is:

1. A drive current limiting method in an electric power steering apparatus, which monitors a magnitude of a drive current supplied to a motor for generating an auxiliary steering torque and limits a current value of an excessively flowing drive current, comprising the steps of:

monitoring a steering angular speed and a direction of the drive current;

discriminating a condition in which a steering wheel is locked from a condition in which the steering wheel is turned on the basis of combinations of the steering angular speed and the drive current direction; and executing processing of limiting a current value of an excessive drive current only when the condition in which the steering wheel is locked is determined.

2. A method according to claim 1, wherein the current limiting processing for the condition in which a steering wheel is locked is executed after the condition in which the steering wheel is turned is checked.

* * * * *